(12) United States Patent
    Shimizu (10) Patent No.: US 12,227,172 B2
(45) Date of Patent: Feb. 18, 2025

(54) MONITORING AREA SETTING APPARATUS

(71) Applicant: DENSO CORPORATION, Kariya (JP)

(72) Inventor: Naotsugu Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 219 days.

(21) Appl. No.: 17/817,264

(22) Filed: Aug. 3, 2022

(65) Prior Publication Data

US 2022/0371584 A1  Nov. 24, 2022

Related U.S. Application Data

(63) Continuation of application No. PCT/JP2021/001045, filed on Jan. 14, 2021.

(30) Foreign Application Priority Data

Feb. 6, 2020 (JP) .................................. 2020-018762

(51) Int. Cl.
    *G08G 1/16*     (2006.01)
    *B60W 30/09*    (2012.01)

(52) U.S. Cl.
    CPC .............. *B60W 30/09* (2013.01); *G08G 1/16* (2013.01); *G08G 1/167* (2013.01); *B60W 2520/06* (2013.01); *B60W 2552/10* (2020.02); *B60W 2554/00* (2020.02)

(58) Field of Classification Search
    CPC ..................................................... G08G 1/167
    See application file for complete search history.

(56) References Cited

U.S. PATENT DOCUMENTS

2017/0345312 A1  11/2017  Shimizu et al.

FOREIGN PATENT DOCUMENTS

| DE | 19904097 A1 | * | 8/2000 | ............. B60Q 9/008 |
| EP | 2741270 B1 | * | 11/2020 | ............. B60R 1/002 |
| JP | 2003276542 A | * | 10/2003 | |
| JP | 2006-264635 A | | 10/2006 | |
| JP | 2007-188349 A | | 7/2007 | |
| JP | 2017-056786 A | | 3/2017 | |
| JP | 2018101376 A | * | 6/2018 | |
| KR | 20140073709 A | * | 6/2014 | |

* cited by examiner

*Primary Examiner* — Dino Kujundzic
(74) *Attorney, Agent, or Firm* — Maschoff Brennan

(57) ABSTRACT

A monitoring area setting apparatus is mountable to an own vehicle and sets a monitoring area that indicates an area for monitoring objects in a vicinity of the own vehicle. The monitoring area setting apparatus acquires (i) at least either of a vehicle-width movement amount that indicates an amount of movement in a vehicle-width direction of the own vehicle and an inclination amount that indicates a degree of inclination of the own vehicle relative to an extending direction of a road on which the own vehicle is traveling, and (ii) information that the own vehicle has changed traffic lanes. The monitoring area setting apparatus sets the monitoring area taking into consideration at least either of the vehicle-width movement amount and the inclination amount in response to the own vehicle changing traffic lanes.

9 Claims, 11 Drawing Sheets

MONITORING AREA SETTING APPARATUS

CROSS-REFERENCE TO RELATED APPLICATIONS

The present application is a continuation application of International Application No. PCT/JP2021/001045, filed on Jan. 14, 2021, which claims priority to Japanese Patent Application No. 2020-018762, filed on Feb. 6, 2020. The contents of these applications are incorporated herein by reference in their entirety.

BACKGROUND

Technical Field

The present disclosure relates to a monitoring area setting apparatus.

Related Art

A monitoring area setting apparatus that is configured to set a monitoring area is known. In the monitoring area setting apparatus, for example, a technology for setting a monitoring area in a position that is adjacent to a traveling trajectory of an own vehicle is proposed.

SUMMARY

An aspect of the present disclosure provides a monitoring area setting apparatus that is mountable to an own vehicle and is configured to set a monitoring area that indicates an area for monitoring objects in a vicinity of the own vehicle. The monitoring area setting apparatus acquires (i) at least either of a vehicle-width movement amount that indicates an amount of movement in a vehicle-width direction of the own vehicle and an inclination amount that indicates a degree of inclination of the own vehicle relative to an extending direction of a road on which the own vehicle is traveling, and (ii) information that the own vehicle has changed traffic lanes. The monitoring area setting apparatus sets the monitoring area taking into consideration at least either of the vehicle-width movement amount and the inclination amount in response to the own vehicle changing traffic lanes.

DESCRIPTION OF THE EMBODIMENTS

For example, JP-A-2016-085567 proposes a technology for setting a monitoring area in a position that is adjacent to a traveling trajectory of an own vehicle.

However, as a result of a detailed review by the inventors, an issue has been found in that, in the technology in JP-A-2016-085567, the monitoring area may not be appropriately set when the own vehicle performs lane change or the like. Specifically, for example, when the own vehicle changes traffic lanes, the monitoring area is set not in a first adjacent lane that is adjacent, but rather, in a second adjacent lane that is further adjacent to the first adjacent lane, when viewed from an own lane in which the own vehicle is positioned. The first adjacent lane is not set as the monitoring area.

It is thus desired to provide a monitoring area setting apparatus that is capable of appropriately setting a monitoring area when the own vehicle performs lane change.

A first exemplary embodiment provides a monitoring area setting apparatus that is mountable to an own vehicle and is configured to set a monitoring area that indicates an area for monitoring objects in a vicinity of the own vehicle. The monitoring area setting apparatus includes an information acquiring unit and an area setting unit. The information acquiring unit is configured to acquire (i) at least either of a vehicle-width movement amount that indicates an amount of movement in a vehicle-width direction of the own vehicle and an inclination amount that indicates a degree of inclination of the own vehicle relative to an extending direction of a road on which the own vehicle is traveling, and (ii) information that the own vehicle has changed traffic lanes. The area setting unit is configured to set the monitoring area taking into consideration at least either of the vehicle-width movement amount and the inclination amount in response to the own vehicle changing traffic lanes.

According to a configuration of the monitoring area setting apparatus, in response to the own vehicle changing traffic lanes, the monitoring area is set taking into consideration at least either of the vehicle-width movement amount and the inclination amount. Consequently, the monitoring area can be favorably set even after lane change.

A second exemplary embodiment provides a monitoring area setting apparatus that is mountable to an own vehicle and is configured to set a monitoring area that indicates an area for monitoring objects in a vicinity of the own vehicle. The monitoring area setting apparatus includes: a processor; a non-transitory computer-readable storage medium; and a set of computer-executable instructions stored on the computer-readable storage medium that when read and executed by the processor, that cause the processor to implement: acquiring (i) at least either of a vehicle-width movement amount that indicates an amount of movement in a vehicle-width direction of the own vehicle and an inclination amount that indicates a degree of inclination of the own vehicle relative to an extending direction of a road on which the own vehicle is traveling, and (ii) information that the own vehicle has changed traffic lanes; and setting the monitoring area taking into consideration at least either of the vehicle-width movement amount and the inclination amount in response to the own vehicle changing traffic lanes.

According to a configuration of the monitoring area setting apparatus, in response to the own vehicle changing traffic lanes, the monitoring area is set taking into consideration at least either of the vehicle-width movement amount and the inclination amount. Consequently, the monitoring area can be favorably set even after lane change.

A third exemplary embodiment provides a monitoring area setting method for setting a monitoring area that indicates an area for monitoring objects in a vicinity of an own vehicle, the monitoring area setting apparatus method including: acquiring (i) at least either of a vehicle-width movement amount that indicates an amount of movement in a vehicle-width direction of the own vehicle and an inclination amount that indicates a degree of inclination of the own vehicle relative to an extending direction of a road on which the own vehicle is traveling, and (ii) information that the own vehicle has changed traffic lanes; and setting the monitoring area taking into consideration at least either of the vehicle-width movement amount and the inclination amount in response to the own vehicle changing traffic lanes.

According to a configuration of the monitoring area setting method, in response to the own vehicle changing traffic lanes, the monitoring area is set taking into consideration at least either of the vehicle-width movement amount and the inclination amount. Consequently, the monitoring area can be favorably set even after lane change.

An embodiment of the present disclosure will hereinafter be described with reference to the drawings.

1. Embodiment

[1-1. Configuration]

An embodiment of the present disclosure will hereinafter be described with reference to the drawings.

For example, a monitoring area setting apparatus 1 according to an aspect of the present disclosure may be an apparatus that is mountable to a vehicle, such as a passenger car. The vehicle in which the monitoring area setting apparatus 1 is mounted is referred to as an own vehicle 50 (for example, refer to FIG. 4). The monitoring area setting apparatus 1 is configured to set a monitoring area 63A or 63B (for example, refer to FIG. 6) that indicates an area for monitoring objects in a vicinity of the own vehicle 50.

Figure 1:
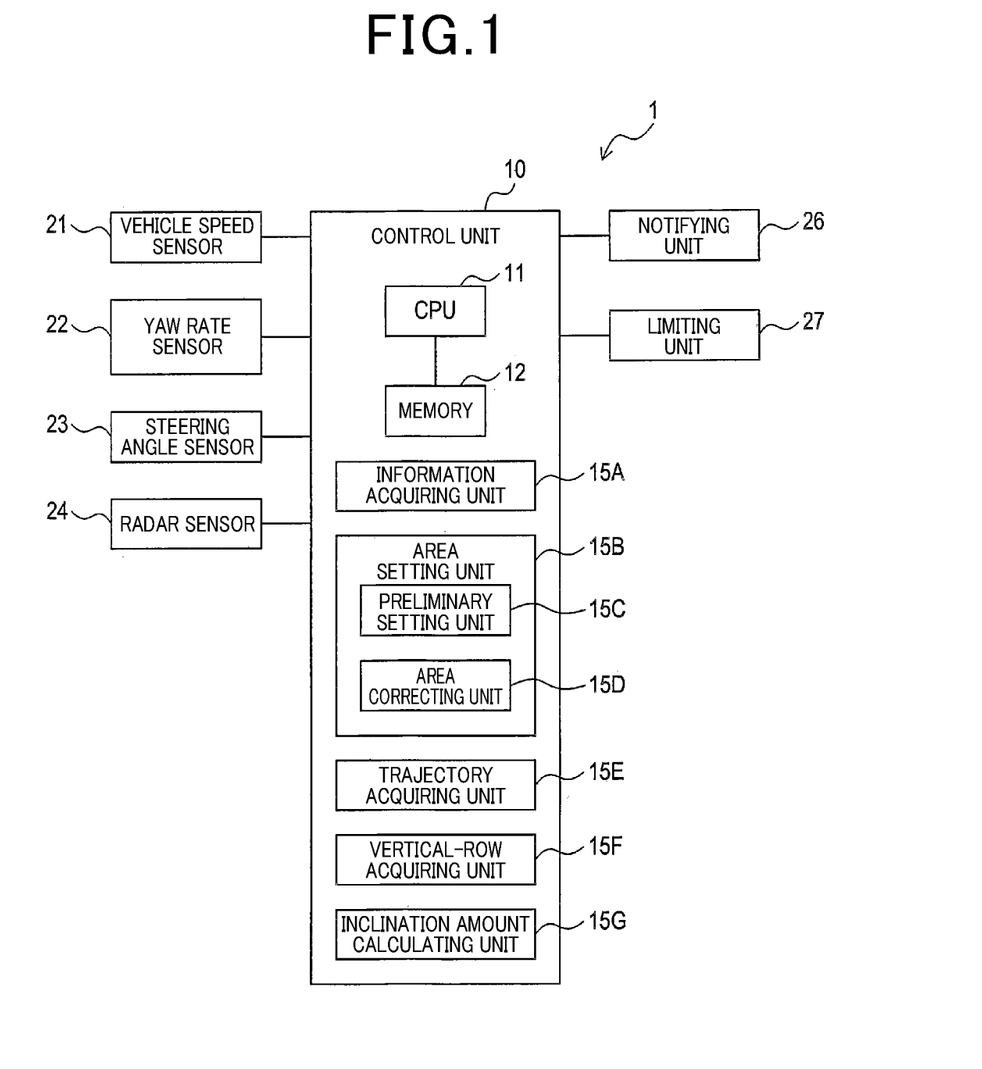
FIG. 1 is a block diagram illustrating a configuration of a monitoring area setting apparatus.

As shown in FIG. 1, the monitoring area setting apparatus 1 includes a control unit 10. The monitoring area setting apparatus 1 may also include a vehicle speed sensor 21, a yaw rate sensor 22, a steering angle sensor 23, a radar sensor 24, a notifying unit 26, and a limiting unit 27.

The vehicle speed sensor 21 detects a traveling speed, that is, a vehicle speed of the own vehicle 50 and sends a detection result to the control unit 10. The yaw rate sensor 22 detects a turning angular velocity of the own vehicle 50 and sends a detection result to the control unit 10. The steering angle sensor 23 detects a steering angle that is an angle of steering of the own vehicle 50 and sends a detection result to the control unit 10. The control unit 10 can calculate a turn radius from the steering angle.

The radar sensor 24 corresponds to an object detecting unit of the present disclosure. The radar sensor 24 respectively transmits radar waves towards a left side and a right side to the rear of the own vehicle 50, and thereby detects objects that include a moving object (such as another vehicle, such as an automobile or a two-wheeled vehicle) and a roadside object (such as a stationary object that is present in the vicinity of the vehicle, such as a guardrail or a tree) that are present within a detection range that includes the monitoring area 63A or 63B. The notifying unit 26 and the limiting unit 27 correspond to an action unit of the present disclosure. The notifying unit 26 is configured to issue a warning to an occupant of the own vehicle 50 or a person in the vicinity of the own vehicle 50 when an object is detected within the monitoring area 63A or 63B within the detection range of the radar sensor 24. For example, the notifying unit 26 may include an audio output apparatus that is set inside a vehicle cabin or outside the vehicle cabin, and outputs a warning sound to the occupant of the own vehicle 50, another vehicle in the vicinity of the own vehicle 50, or the like. In addition, for example, the notifying unit 26 may include a light emitting unit that is made to display an image or emits light, and warns the occupant of the own vehicle 50, another vehicle in the vicinity of the own vehicle 50, or the like through the light emitting unit.

When an object is detected within the monitoring area 63A or 63B within the detection range, the limiting unit 27 performs control to suppress collision of at least a portion of the vehicle with the object. For example, the limiting unit 27 may include at least any of a function for performing door locking, a function for disabling accelerator pedal operation, a function for performing automatic braking, and the like.

As shown in FIG. 1, the control unit 10 is an electronic control apparatus that is mainly configured by a known microcomputer that includes a central processing unit (CPU) 11, a memory 12, and the like. Various functions of the microcomputer are implemented by the CPU 11 running a program that is stored in a non-transitory computer-readable storage medium. In this example, the memory 12 corresponds to the non-transitory computer-readable storage medium in which the program is stored. In addition, as a result of the program being run, a method that corresponds to the program is performed.

Here, the non-transitory computer-readable storage medium means that electromagnetic waves are excluded from the storage medium. In addition, the CPU 11 may be configured by a single microcomputer or a plurality of microcomputers.

As functions of the CPU 11, as shown in FIG. 1, an information acquiring unit 15A and an area setting unit 15B are provided. As the functions of the CPU 11, a trajectory acquiring unit 15E, a vertical-row acquiring unit 15F, and an inclination amount calculating unit 15G may also be provided. The area setting unit 15B further includes a provisional setting unit 15C and an area correcting unit 15D. Functions of these units that are included in the CPU 11 will be described hereafter.

A method for actualizing the functions of the units that are included in the CPU 11 is not limited to software. Some or all of the functions may be implemented using a single or a plurality of pieces of hardware. For example, when the above-described functions are implemented by an electronic circuit that is hardware, the electronic circuit may be configured by a digital circuit, an analog circuit, or a combination thereof. Furthermore, processes performed by the CPU 11 are hereafter described as processes performed by the control unit 10.

[1-2. Processes]

A hazard suppression process performed by the control unit 10 will be described with reference to a flowchart in FIG. 2. The hazard suppression process is a process in which, when an object that is approaching the own vehicle 50 from behind is present and the object is positioned within the monitoring area 63A or 63B, action that may cause a collision with the object, such as the own vehicle 50 starting or the occupant of the own vehicle 50 alighting from the own vehicle, is suppressed. For example, the hazard suppression process may be started when the traveling speed of the own vehicle 50 is equal to or less than a predetermined speed threshold (such as about 10 km per hour), and repeatedly performed as long as the traveling speed of the own vehicle 50 is equal to or less than the speed threshold.

Figure 2:
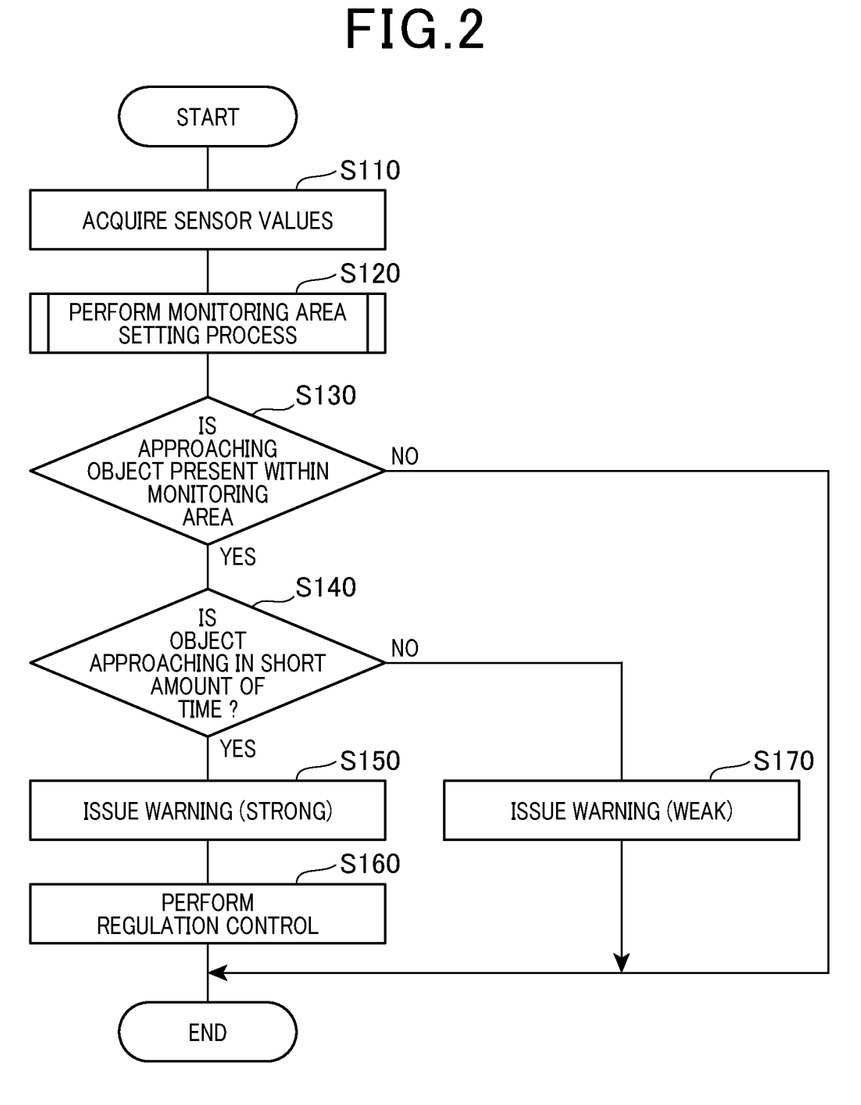
FIG. 2 is a flowchart illustrating a hazard suppression process.

As shown in FIG. 2, in the hazard suppression process, first, at S110, the control unit 10 acquires sensor values. The sensors include the above-described vehicle speed sensor 21, the yaw rate sensor 22, the steering angle sensor 23, and the radar sensor 24. For example, the sensor values may be recorded (stored) in the memory 12 and held in the memory 12 for a predetermined amount of time.

Next, at S120, the control unit 10 performs a monitoring area setting process. The monitoring area setting process will be described with reference to a flowchart FIG. 3.

Figure 3:
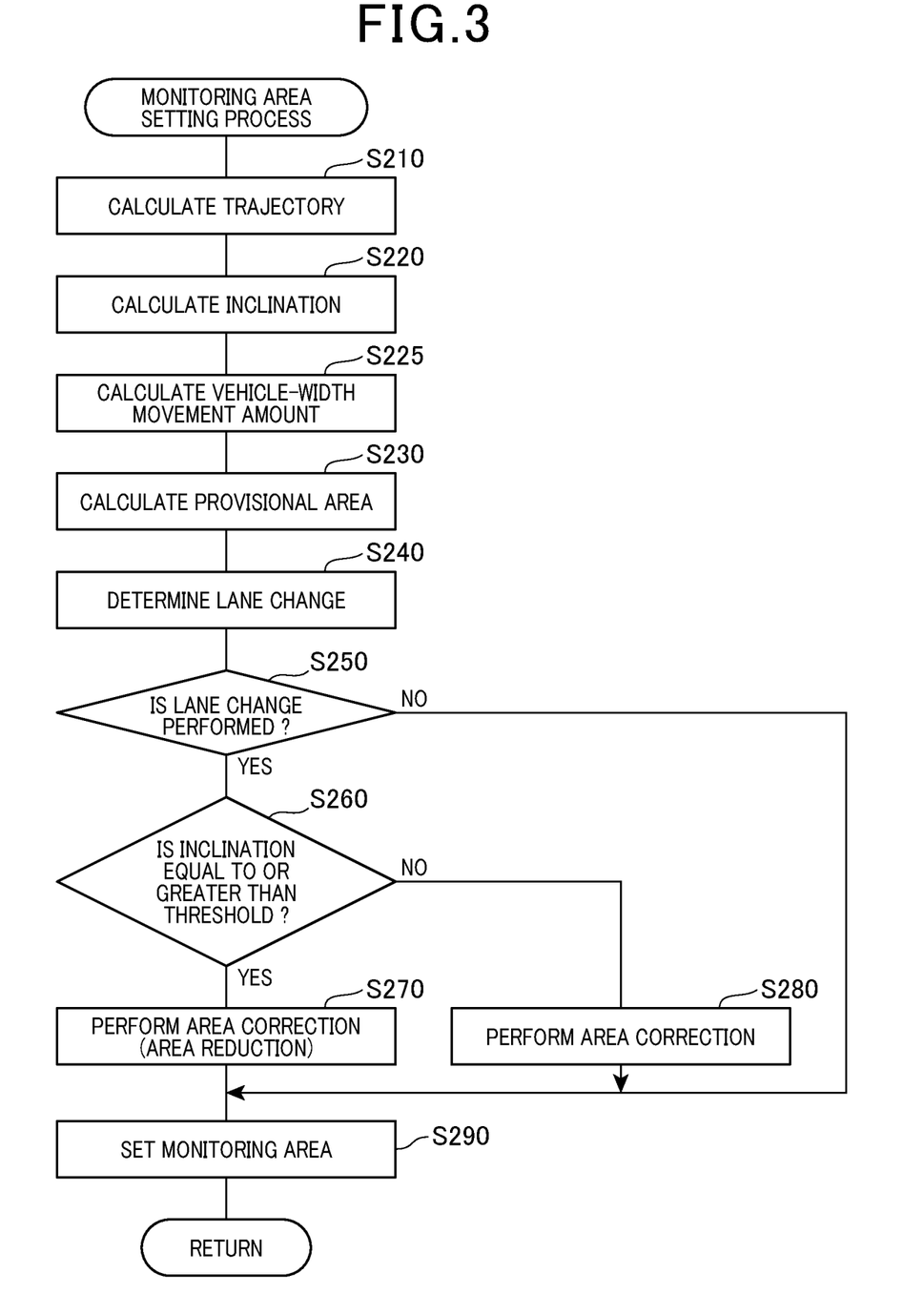
FIG. 3 is a flowchart illustrating a monitoring area setting process.
Figure 4:
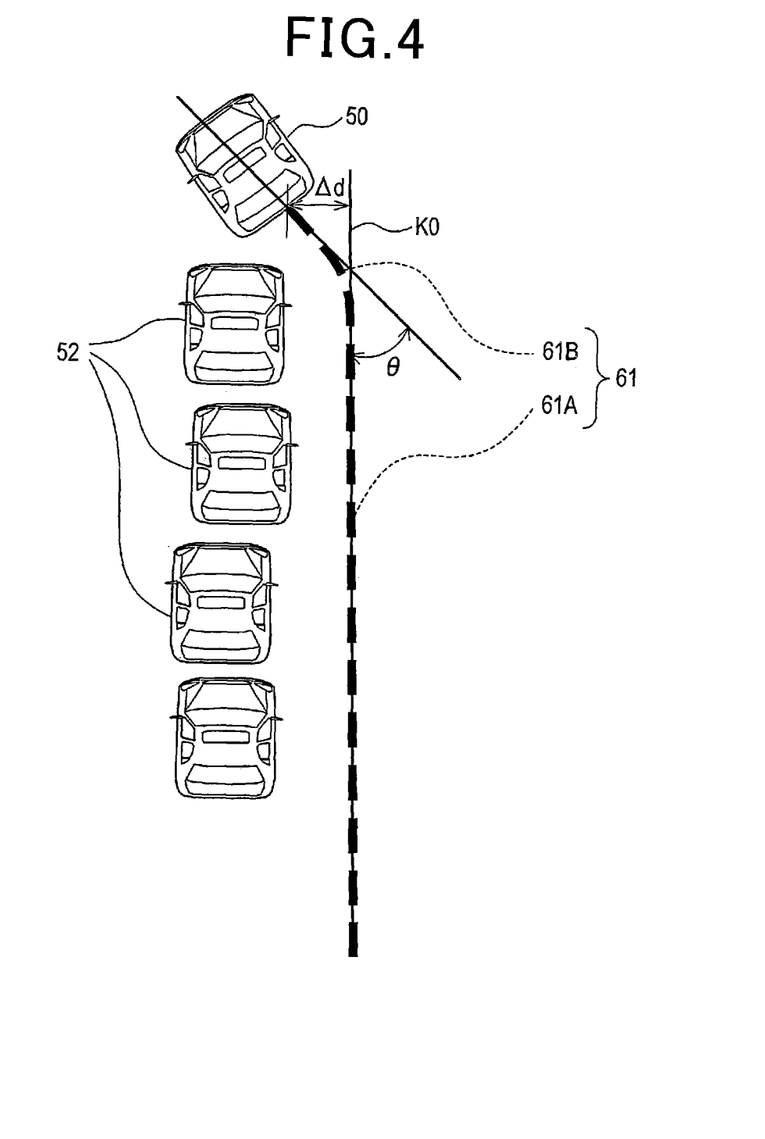
FIG. 4 is a plan view of a traveling trajectory and an inclination amount.

As shown in FIG. 3, at S210 in the monitoring area setting process, the trajectory acquiring unit 15E of the control unit 10 acquires a traveling trajectory 61 of the own vehicle 50 (for example, refer to FIG. 4). In this process, the control unit 10 calculates the traveling trajectory 61 of the own vehicle 50 using the detection results from the yaw rate sensor 22 or the steering angle sensor 23, and the vehicle speed sensor 21 that are acquired in time series, and the trajectory acquiring unit 15E acquires the traveling trajectory 61.

Next, at S220, the information acquiring unit 15A of the control unit 10 acquires an inclination relative to an extending direction of a road on which the own vehicle 50 is traveling. The inclination is referred to, hereafter, as an inclination amount θ. In this process, first, as shown in FIG. 4, the control unit 109 divides the traveling trajectory 61 of the own vehicle 50 into a straight-moving portion 61A in which the own vehicle 50 is considered to be moving straight ahead and a turning portion 61B in which the own vehicle 50 is considered to be steering, and an approximated straight line K0 of the straight-moving portion 61A is acquired.

For example, the straight-moving portion 61A may be a portion of the traveling trajectory 61 in which a steering angle or a rate of change in the steering angle is less than a predetermined steering angle threshold. In addition, for example, the approximated straight line K0 may be determined as a straight line that connects two arbitrary points that configure the straight-moving portion 61, a tangent of the traveling trajectory 61 at a boundary between the straight-moving portion 61A and the turning portion 61B, or the like. As shown in FIG. 4, an angle formed by an orientation of the own vehicle 50, that is, an orientation in a front/rear direction that is orthogonal to a vehicle-width direction of the own vehicle 50 and the approximated straight line K0 is the inclination amount θ.

Next, at S225, the information acquiring unit 15A acquires a vehicle-width movement amount Δd. The vehicle-width movement amount Δd indicates an amount of movement in the vehicle-width direction that is orthogonal to the extending direction of the road. As the extending direction of the road, a direction that is parallel to the approximated straight line K0 may be used, or the extending direction of the road may be acquired from map information or the like.

The vehicle-width movement amount Δd can be determined by the steering angle or the yaw rate of the own vehicle 50 and the vehicle speed of the own vehicle 50 being continuously recognized. In addition, as shown in FIG. 4, the vehicle-width movement amount Δd can be determined as a distance from the above-described approximated straight line K0.

Figure 5:
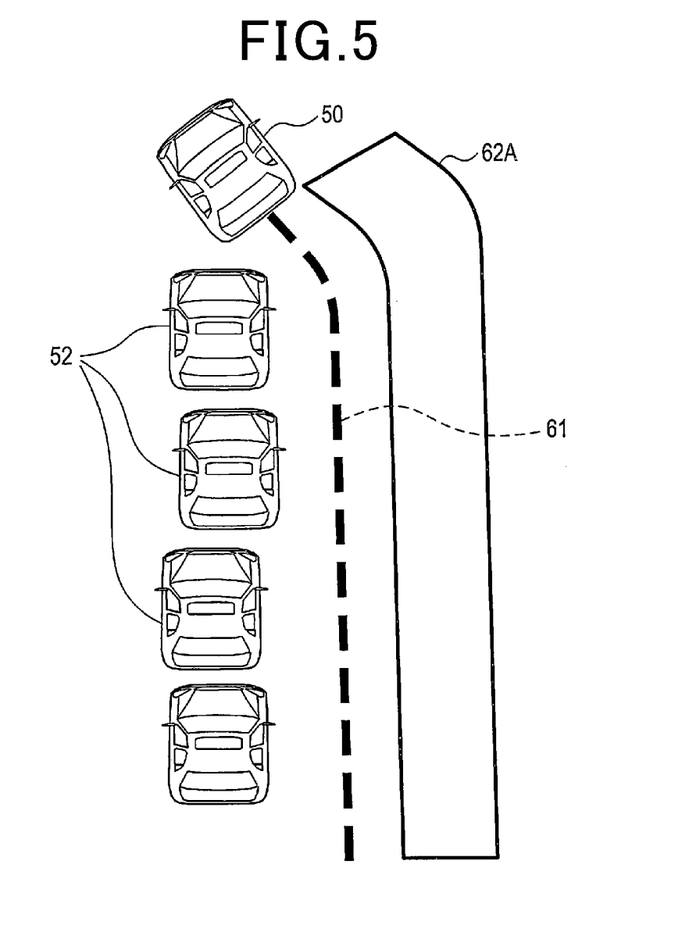
FIG. 5 is a plan view of a provisional area based on the traveling trajectory.

Next, at S230, the provisional setting unit 15C of the control unit 10 calculates a provisional area. The provisional area is a provisional monitoring area. In this process, the provisional setting unit 15C sets a provisional area 62A with reference to a position of the own vehicle 50. In particular, as shown in FIG. 5, the provisional setting unit 15C sets an area to the rear of the own vehicle 50 and adjacent to the traveling trajectory 61 as the provisional area 62A. The provisional area 62A is set to an area in which a traffic lane that is adjacent to a traffic lane through which the traveling trajectory passes 61 is estimated to be present.

Next, at S240, the control unit 10 determines whether the own vehicle 50 has performed lane change. In this process, for example, when the vehicle-width movement amount Δd is equal to or greater than a predetermined vehicle width threshold (such as about 2.5 m), the own vehicle 50 can be recognized as having performed lane change. In addition, the configuration may be such that the control unit 10 acquires information that lane change has been performed from outside the control unit 10.

Next, at S250, the control unit 10 determines whether the own vehicle 50 has changed traffic lanes. When determined that the own vehicle 50 has not changed traffic lanes at S250, the control unit 10 proceeds to S290 and directly sets the provisional area 62A as the monitoring area. Meanwhile, when determined that the own vehicle 50 has changed traffic lanes at S250, the control unit 10 proceeds to S260 and determines whether the inclination amount θ of the own vehicle 50 relative to the extending direction of the road is equal to or greater than a predetermined inclination threshold.

Based on a determination result regarding the inclination, the control unit 10 proceeds to S270 or S280, and in either process, the area correcting unit 15D performs area correction. Specifically, when determined that the inclination is less than the threshold at S260, the control unit 10 proceeds to S280 and the area correcting unit 15D corrects the position of the provisional area 62A to be closer in the vehicle-width direction of the own vehicle 50, taking into consideration the inclination amount θ and the vehicle-width movement amount Δd.

Figure 6:
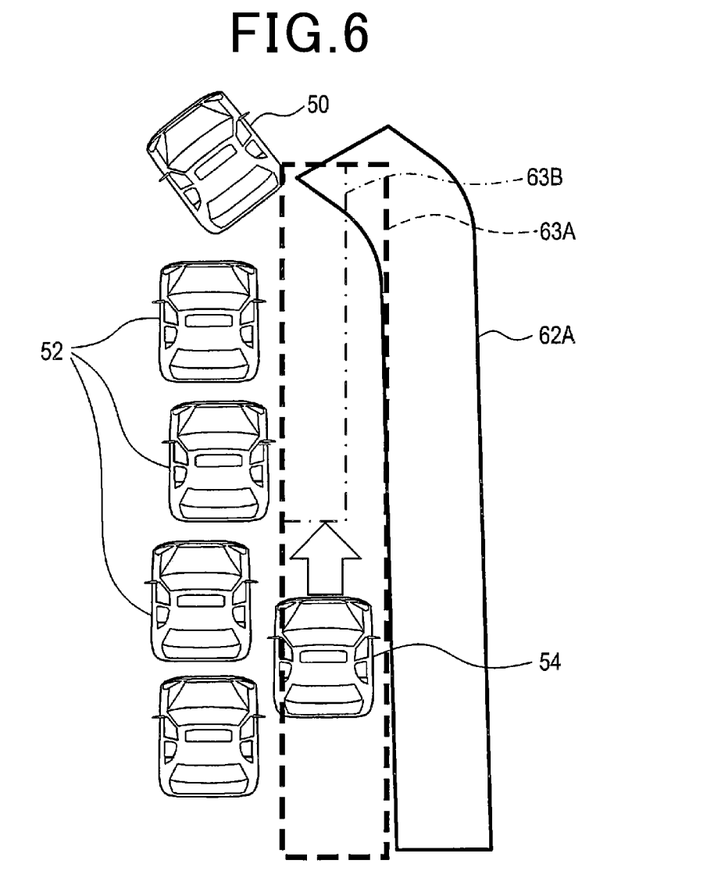
FIG. 6 is a plan view of a monitoring area obtained by the provisional area being corrected.

For example, the position of the provisional area 62A may be shifted towards the own vehicle 50 side by an amount amounting to the vehicle-width movement amount Δd. As shown in FIG. 6, at S290, the area correcting unit 15D sets the provisional area 62A after correction as the monitoring area 63A.

In addition, when determined that the inclination amount θ is equal to or more than the threshold at S260, the control unit 10 proceeds to S270 and similarly corrects the position of the provisional area 62A towards the own vehicle 50 side taking into consideration the inclination amount and the vehicle-width movement amount Δd. However, in S270, because the inclination is large, a state is such that erroneous notification easily occurs. Therefore, the area correcting unit 15D corrects the provisional area 62A to be the monitoring area 63B that has a smaller area than the monitoring area 63A, and subsequently proceeds to S290. In the monitoring area 63B that is set herein, a width in the vehicle-width direction and a distance from the own vehicle 50 to a farthest end portion are both smaller compared to those of the monitoring area 63A.

Then, as shown in FIG. 6, at S290, the area correcting unit 15D sets the provisional area 62A after correction as the monitoring area 63B. That is, at S290, the control unit 10 sets a newest provisional area as the monitoring area and subsequently ends the monitoring area setting process in FIG. 3.

Next, returning to FIG. 2, at S130, the control unit 10 determines whether an approaching object is present within the monitoring area 63A or 63B that is set at S290 of the monitoring area setting process. In this process, the control unit 10 determines whether coordinates of the object that is recognized by the radar sensor 24 is within the monitoring area 63A or 63B. When the coordinates are within the monitoring area 63A or 63B and the object is an object that is approaching (that is, an approaching object), the control unit 10 makes an affirmative determination.

When determined that an approaching object is not present in the monitoring area at S130, the control unit 10 ends the hazard suppression process in FIG. 2. Meanwhile, when determined that an approaching object is present within the monitoring area at S130, the control unit 10 proceeds to S140 and determines whether the approaching object will approach the own vehicle 50 in a shorter amount of time than a predetermined time threshold. For example, the amount of time until the approaching object approaches the own vehicle 50 can be determined by a distance between the approaching object and the own vehicle 50 being divided by a relative movement speed of the approaching object to the own vehicle 50.

When determined that the approaching object will approach in a shorter amount of time than the time threshold at S140, the control unit 10 proceeds to S150 and issues a relatively strong warning. For example, a sound volume of the warning sound may be set to be relatively loud, and in combination with a lamp, vibrations, or the like, notification is given to the occupant of the own vehicle 50 and the like.

Next, at S160, the control unit 10 performs control to suppress alighting of the occupant, such as locking a door. Subsequently, the hazard suppression process in FIG. 2 is ended.

Meanwhile, when determined that the approaching object will approach in a longer amount of time than the time threshold at S140, the control unit 10 proceeds to S170 and issues a relatively weak warning. For example, the sound volume of the warning sound may be set to be relatively small, and notification to prompt caution is issued to the occupant of the own vehicle 50 and the like. Subsequently, the hazard suppression process in FIG. 2 is ended.

[1-3. Effects]

According to the first embodiment described in detail above, following effects are achieved.

(1a) An aspect of the present disclosure is the monitoring area setting apparatus 1 that is mountable to the own vehicle 50 and configured to set the monitoring area 63A or 63B that indicates an area for monitoring objects in the vicinity of the own vehicle 50. The monitoring area setting apparatus 1 includes the information acquiring unit 15A (S220, S225, S240) and the area setting unit 15B (S230, S270 to S290).

The information acquiring unit 15A is configured to acquire at least either of the vehicle-width movement amount Δd that indicates the movement amount in the vehicle-width direction of the own vehicle 50 and the inclination amount θ that indicates a degree of inclination of the own vehicle 50 relative to the extending direction of the road on which the own vehicle 50 is traveling, and information that the own vehicle 50 has changed traffic lanes.

When the own vehicle 50 changes traffic lanes, the area setting unit 15B is configured to set the monitoring area 63A or 63B taking into consideration at least either of the vehicle-width movement amount Δd and the inclination amount θ.

As a result of a configuration such as this, when the own vehicle 50 changes traffic lanes, the monitoring area 63A or 63B is set taking into consideration at least either of the vehicle-width movement amount Δd and the inclination amount θ. Therefore, the monitoring area 63A or 63B can be favorably set even after lane change.

(1b) According to an aspect of the present disclosure, the area setting unit 15B further includes the provisional setting unit 15C and the area correcting unit 15D. The provisional setting unit 15C is configured to set the provisional area 62A with reference to the position of the own vehicle 50.

When the own vehicle 50 changes traffic lanes, the area correcting unit 15D is configured to correct the position of the provisional area 62A taking into consideration the vehicle-width movement amount Δd and the inclination amount θ, and sets the provisional area 62A after correction as the monitoring area 63A or 63B.

As a result of a configuration such as this, the provisional area 62A is set, and the monitoring area 63A or 63B is set by the provisional area 62A being corrected taking into consideration at least either of the vehicle-width movement amount Δd and the inclination amount θ. Consequently, the appropriate monitoring area 63A or 63B can be set.

(1c) According to an aspect of the present disclosure, the trajectory acquiring unit 15E that is configured to acquire the traveling trajectory 61 of the own vehicle 50 is further provided. The information acquiring unit 15A is configured to acquire information that lane change has been performed, the inclination amount θ, and the vehicle-width movement amount Δd.

The provisional setting unit 15C is configured to set the provisional area 62A in the area that is adjacent to the traveling trajectory 61. When the own vehicle 50 changes traffic lanes, the area correcting unit 15D corrects the position of the provisional area 62A in the vehicle-width direction of the own vehicle 50 taking into consideration the vehicle-width movement amount and the inclination amount, and sets the provisional area 62A after correction as the monitoring area 63A or 63B.

As a result of a configuration such as this, the provisional setting unit 15C sets the provisional area 62A in the area that is adjacent to the traveling trajectory 61, and the area correcting unit 15D sets the monitoring area 63A or 63B by correcting the position of the provisional area 62A in the vehicle-width direction of the own vehicle 50. Consequently, the monitoring area 63A or 63B that runs along the traveling trajectory 61 can be set.

(1d) According to an aspect of the present disclosure, the radar sensor 24, the notifying unit 26, and the limiting unit 27 are further provided.

The radar sensor 24 is configured to detect an object that is positioned in an area surrounding the own vehicle 50 including the monitoring area 63A or 63B. When an object is detected within the monitoring area 63A or 63B, the notifying unit 26 and the limiting unit 27 are configured to perform control to suppress collision of at least a portion of the vehicle with the object, or issue a warning to the occupant of the own vehicle 50 or a person in the vicinity of the own vehicle 50.

As a result of a configuration such as this, when an object is detected within the monitoring area 63A or 63B, control to suppress collision with the object or warning is performed. Consequently, a collision between the own vehicle 50 and the object can be suppressed.

2. Other Embodiments

An embodiment of the present disclosure is described above. However, the present disclosure is not limited to the above-described embodiment and can be carried out with various modifications.

(2a) According to the above-described embodiment, the provisional area 62A is set from the traveling trajectory 61, and the monitoring area 63A or 63B is determined by the provisional area 62A being corrected. However, this is not limited thereto. Specifically, the following is possible.

Figure 7:
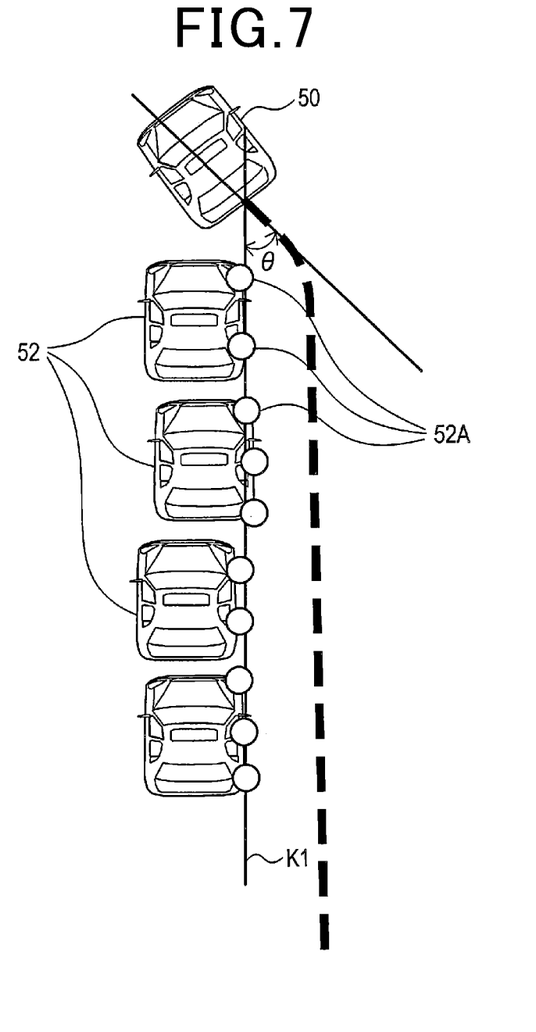
FIG. 7 is a plan view of a calculation method for the inclination amount in a variation example.

(2a-1) For example, as shown in FIG. 7, the inclination amount of the own vehicle 50 may be calculated based on positions of a line of vehicles 52. Here, the line of vehicles 52 refer to a plurality of other vehicles that are parallel parked along the extending direction of the road. However, the line of vehicles 52 may be a plurality of other vehicles that are traveling in a tracking manner in a same traffic lane.

In this case, the vertical-row acquiring unit 15F acquires the positions of the line of vehicles 52 at S110. When the own vehicle 50 passes beside the line of vehicles 52, the radar sensor 24 or the like detects a plurality of distance measurement points 52A that indicate positions of side surfaces of the line of vehicles 52, and the detection result is stored in the memory 12 as the positions of the line of vehicles 52.

Then, at S220, the inclination amount calculating unit 15G sets a virtual line K1 based on the positions of the line of vehicles 52 and calculates an angle formed by the virtual line K1 and the orientation of the own vehicle 50 as the inclination amount θ. The virtual line K1 is a virtual straight line that is determined based on the positions of the line of vehicles 52. The information acquiring unit 15A acquires the inclination amount θ that is calculated by the inclination amount calculating unit 15B. Then, the area setting unit 15B sets the monitoring area 63A or 63B that is adjacent to the virtual line K1 based on the position of the virtual straight line K1. For example, the area setting unit 15B may set the monitoring area 63A or 63B in a traffic lane that is adjacent to a traffic lane in which the virtual line K1 is positioned.

As a result of a configuration such as this, the inclination amount θ can be calculated based on the positions of the line of vehicles 52. Therefore, for example, compared to the configuration in which the inclination amount θ is calculated from the traveling trajectory 61 of the own vehicle 50, the inclination amount θ can be easily and accurately calculated.

Figure 8:
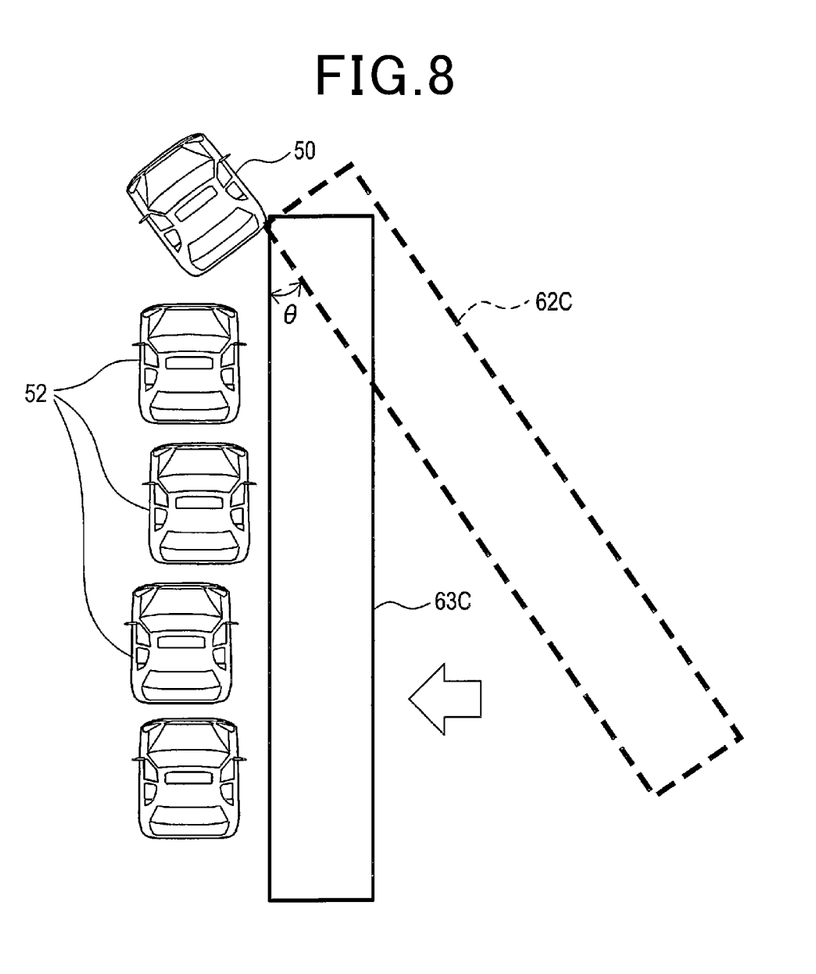
FIG. 8 is a plan view of a setting method for the monitoring area in a variation example.

(2a-2) In addition, for example, as shown in FIG. 8, the provisional setting unit 15C may set a predetermined area that is positioned in a predetermined direction in the vicinity of the own vehicle 50 as a provisional area 62C. Here, the provisional area 62C that has a width that amounts to a single traffic lane may be set to the rear the own vehicle 50 on the right side, along a right side surface of the own vehicle 50.

Then, when the own vehicle 50 changes traffic lanes, the area correcting unit 15D corrects a position of the provisional area 62C by rotating the provisional area 62C by an amount amounting to the inclination amount θ, and sets a monitoring area 63C.

As a result of a configuration such as this, even when the traveling trajectory 61 cannot be acquired, the monitoring area 63C can be favorably set if the inclination amount θ is recognizable. Here, in a configuration such as this, the information acquiring unit 15A may omit the process for acquiring the vehicle-width movement amount Δd. In addition, in a case in which the information acquiring unit 15A acquires the vehicle-width movement amount Δd, the area correcting unit 15D may move a new provisional area that is the rotated provisional area 62C in the vehicle-width direction based on the vehicle-width movement amount Δd and set the monitoring area 63C.

Figure 9:
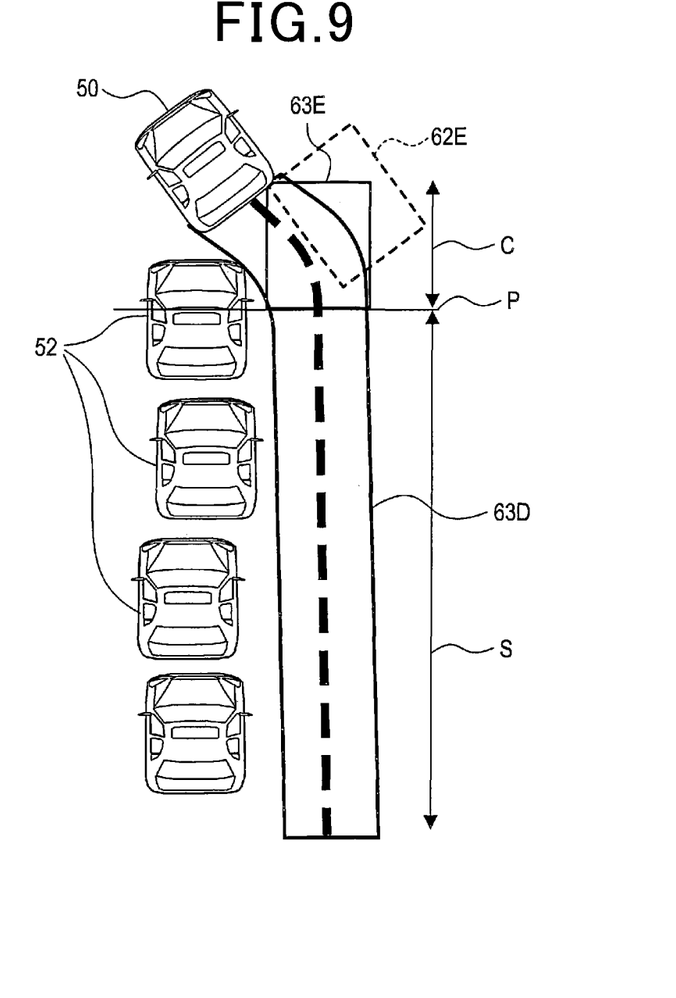
FIG. 9 is a plan view of a setting method for the monitoring area in another variation example.

(2a-3) Furthermore, for example, as shown in FIG. 9, the monitoring area may be set in a divided manner. For example, regarding a portion of the traveling trajectory 61 before start of lane change, the area setting unit 15B may set a portion 63D before the start of lane change as a part of a monitoring area 63D or 63E. Regarding a portion of the traveling trajectory 61 after the start of lane change, the provisional setting unit 15C sets a predetermined area that is positioned in a predetermined direction in the vicinity of the own vehicle 50 as a provisional area 62E. When the own vehicle 50 changes traffic lanes, the area correcting unit 15D corrects a position of the provisional area 62E by rotating the provisional area 62E by an amount amounting to the inclination amount θ, and sets the provisional area 62E after correction as another part of the monitoring area 63D or 63E.

As a result of a configuration such as this, regarding the monitoring area 63D, the traveling trajectory 61 that is the area through which the own vehicle 50 passes before lane change can be used as is. Therefore, the appropriate monitoring area 63D or 63E can be set regardless of the road shape.

Figure 10:
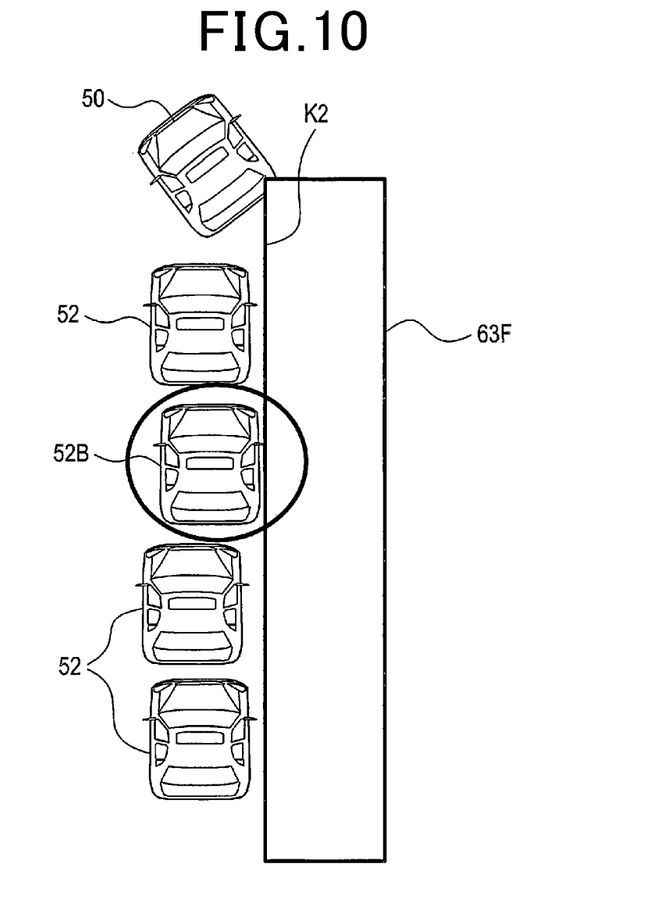
FIG. 10 is a plan view of a setting method for an end portion of the monitoring area in a variation example.

(2a-4) In addition, for example, a position of an end portion of the monitoring area may be set based on the positions of the line of vehicles 52. Specifically, for example, the area setting unit 15B may set an end portion of a monitoring area 63F on the line of vehicles 52 side such that the line of vehicles 52 are not included in the monitoring area 63F, based on the positions of the line of vehicles 52.

More specifically, of the vehicle-width direction of the own vehicle 50, a direction on a side opposite a direction in which the own vehicle 50 moves during lane change is an opposite direction. Then, as shown in FIG. 10, the area setting unit 15B sets a virtual straight line K2 with reference to portions of the positions of the line of vehicles 52 that are positioned furthest towards the opposite direction side, and sets the virtual straight line K2 as the end portion of the monitoring area 63F on the line of vehicles 52 side. In the example shown in FIG. 10, the area setting unit 15B sets the virtual straight line K2 with reference to end portions on the right side of the line of vehicles 52B that are positioned furthest towards the right side.

As a result of a configuration such as this, the area setting unit 15B can set the position of the end portion of the monitoring area 63F on the line of vehicles 52 side such that the line of vehicles 52 are not included in the monitoring area 63F. Therefore, the line of vehicles 52 that do not require monitoring can be prevented from being included in the monitoring area 63F. In addition, as a result of a configuration such as this, when the area setting unit 15B sets the monitoring area 63F that does not include the line of vehicles 52, the end portion of the monitoring area 63F on the line of vehicles 52 side can be set by a simple process.

Figure 11:
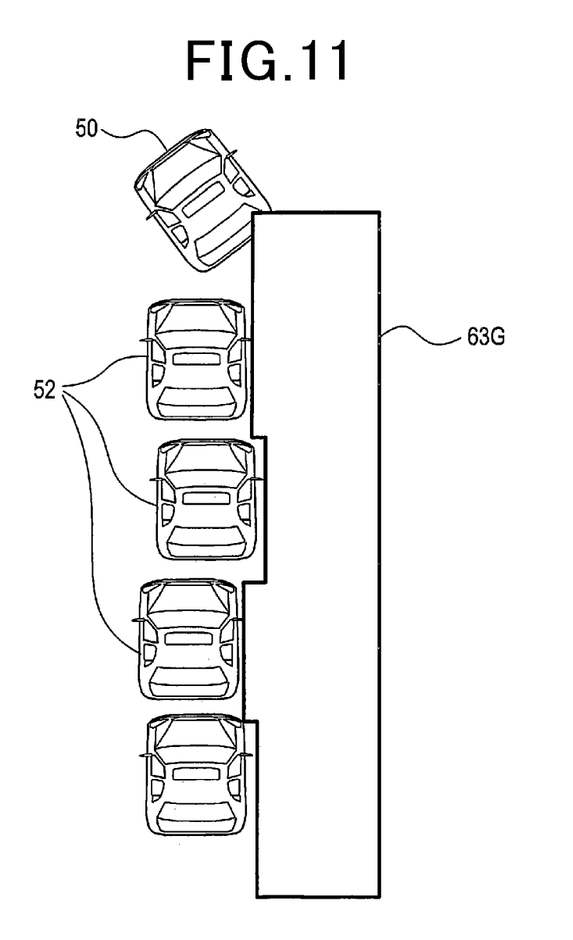
FIG. 11 is a plan view of a setting method for the end portion of the monitoring area in another variation example.

(2a-5) Furthermore, for example, as shown in FIG. 11, the area setting unit 15B may set an end portion of a monitoring area 63G on the line of vehicles 52 side along the position of each vehicle that configures the line of vehicles 52.

As a result of a configuration such as this, because the end portion of the monitoring area 63G on the line of vehicles 52 side is set along the positions of the line of vehicles 52, an object that moves along the line of vehicles 52 can be more easily monitored in the monitoring area 63G.

(2b) A plurality of functions provided by a single constituent element according to the above-described embodiments may be implemented by a plurality of constituent elements. A single function provided by a single constituent element may be implemented by a plurality of constituent elements. In addition, a plurality of functions provided by a plurality of constituent elements may be implemented by a single constituent element. A single function provided by a plurality of constituent elements may be implemented by a single constituent element. Furthermore, a part of a configuration according to the above-described embodiment may be omitted. Moreover, at least a part of a configuration according to an above-described embodiment may be added to or replace a configuration according to another of the above-described embodiments.

(2c) The present disclosure can also be implemented by various modes in addition to the above-described monitoring area setting apparatus 1, such as a system in which the monitoring area setting apparatus 1 is a constituent element, a program for enabling a computer to function as the monitoring area setting apparatus 1, a non-transitory computer-readable storage medium such as a semiconductor memory that stores the program therein, and a monitoring area setting method.

What is claimed is:

1. A monitoring area setting apparatus that is mountable to an own vehicle and is configured to set a monitoring area that indicates an area for monitoring objects in a vicinity of the own vehicle, the monitoring area setting apparatus comprising one or more processors configured to implement:
    an information acquiring unit that is configured to acquire (i) at least either of a vehicle-width movement amount that indicates an amount of movement in a vehicle-width direction of the own vehicle and an inclination amount that indicates a degree of inclination of the own vehicle relative to an extending direction of a road on which the own vehicle is traveling, and (ii) information that the own vehicle has changed traffic lanes; and
    an area setting unit that is configured to set the monitoring area taking into consideration at least either of the vehicle-width movement amount and the inclination amount, in response to the own vehicle changing traffic lanes; and
    a trajectory acquiring unit that is configured to acquire a traveling trajectory of the own vehicle, wherein:
    the area setting unit comprises:
        a provisional setting unit that is configured to set a provisional area with reference to a position of the own vehicle; and
        an area correcting unit that is configured to:
            correct a position of the provisional area taking into consideration at least either of the vehicle-width movement amount and the inclination amount, in response to the own vehicle changing traffic lanes; and
            set the provisional area after correction as the monitoring area;
        regarding a first portion of the traveling trajectory before a start of lane change, the area setting unit is configured to set the first portion as a part of the monitoring area;
        regarding a second portion of the traveling trajectory after the start of lane change, the provisional setting unit is configured to set a predetermined area that is positioned in a predetermined direction in the vicinity of the own vehicle as the provisional area; and
        the area correcting unit is configured to:
            correct the position of the provisional area by rotating the provisional area by an amount amounting to the inclination amount, in response to the own vehicle changing traffic lanes; and
            set the provisional area after correction as another part of the monitoring area.

2. The monitoring area setting apparatus according to claim 1, wherein the one or more processors are further configured to implement:
    an object detecting unit that is configured to detect an object that is positioned in an area in the vicinity of the own vehicle including the monitoring area; and
    an action unit that is configured to perform, in response to an object being detected within the monitoring area, control to suppress collision of at least a portion of the own vehicle with the object.

3. A monitoring area setting apparatus that is mountable to an own vehicle and is configured to set a monitoring area that indicates an area for monitoring objects in a vicinity of the own vehicle, the monitoring area setting apparatus comprising one or more processors configured to perform operations, the operations comprising:
    acquiring (i) at least either of a vehicle-width movement amount that indicates an amount of movement in a vehicle-width direction of the own vehicle and an inclination amount that indicates a degree of inclination of the own vehicle relative to an extending direction of a road on which the own vehicle is traveling, and (ii) information that the own vehicle has changed traffic lanes;
    setting the monitoring area taking into consideration at least either of the vehicle-width movement amount and the inclination amount, in response to the own vehicle changing traffic lanes;
    acquiring positions of a line of vehicles that indicate a plurality of vehicles that are arrayed along the extending direction; and
    setting an end portion of the monitoring area on the line of vehicles side such that the monitoring area does not include the line of vehicles, based on the positions of the line of vehicles.

4. The monitoring area setting apparatus according to claim 3, wherein:
    of the vehicle-width direction of the own vehicle, a direction on a side opposite a direction in which the own vehicle moves during lane change is an opposite direction; and
    the operations further comprise:
        setting a virtual straight line with reference to portions of the positions of the line of vehicles that are positioned furthest towards the opposite direction side, and
        setting the virtual straight line as the end portion of the monitoring area on the line of vehicles side.

5. The monitoring area setting apparatus according to claim 3, wherein the operations further comprise:
    setting to the end portion of the monitoring area on the line of vehicles side along the positions of the line of vehicles.

6. The monitoring area setting apparatus according to claim 3, wherein the operations further comprise:
    setting a virtual line based on the positions of the line of vehicles; and calculating an angle that is formed by the virtual line and an orientation of the own vehicle as the inclination amount.

7. The monitoring area setting apparatus according to claim 3, wherein the operations further comprise:
   detecting an object that is positioned in an area in the vicinity of the own vehicle including the monitoring area; and
   performing, in response to an object being detected within the monitoring area, control to suppress collision of at least a portion of the vehicle with the object.

8. A monitoring area setting apparatus that is mountable to an own vehicle and is configured to set a monitoring area that indicates an area for monitoring objects in a vicinity of the own vehicle, the monitoring area setting apparatus comprising:
   a processor;
   a non-transitory computer-readable storage medium; and
   a set of computer-executable instructions stored on the computer-readable storage medium that when read and executed by the processor, that cause the processor to perform operations comprising:
      acquiring (i) at least either of a vehicle-width movement amount that indicates an amount of movement in a vehicle-width direction of the own vehicle and an inclination amount that indicates a degree of inclination of the own vehicle relative to an extending direction of a road on which the own vehicle is traveling, and (ii) information that the own vehicle has changed traffic lanes;
      acquiring a traveling trajectory of the own vehicle; and
      setting the monitoring area taking into consideration at least either of the vehicle-width movement amount and the inclination amount, in response to the own vehicle changing traffic lanes; wherein:
      setting the monitoring area comprises:
         setting a provisional area with reference to a position of the own vehicle, correcting a position of the provisional area taking into consideration at least either of the vehicle-width movement amount and the inclination amount, in response to the own vehicle changing traffic lanes, and setting the provisional area after correction as the monitoring area,
         regarding a first portion of the traveling trajectory before start of lane change, setting the monitoring area comprises setting the portion before the start of lane change as a part of the monitoring area, and
         regarding a second portion of the traveling trajectory after the start of lane change, setting the provisional area comprises setting a predetermined area that is positioned in a predetermined direction in the vicinity of the own vehicle as the provisional area, and correcting the position of the provisional area comprises:
            correcting the position of the provisional area by rotating the provisional area by an amount amounting to the inclination amount, in response to the own vehicle changing traffic lanes, and
            setting the provisional area after correction as another part of the monitoring area.

9. A monitoring area setting method for setting a monitoring area that indicates an area for monitoring objects in a vicinity of an own vehicle, the monitoring area setting method comprising:
   acquiring (i) at least either of a vehicle-width movement amount that indicates an amount of movement in a vehicle-width direction of the own vehicle and an inclination amount that indicates a degree of inclination of the own vehicle relative to an extending direction of a road on which the own vehicle is traveling, and (ii) information that the own vehicle has changed traffic lanes;
   acquiring a traveling trajectory of the own vehicle; and
   setting the monitoring area taking into consideration at least either of the vehicle-width movement amount and the inclination amount, in response to the own vehicle changing traffic lanes; wherein:
   setting the monitoring area comprises:
      setting a provisional area with reference to a position of the own vehicle,
      correcting a position of the provisional area taking into consideration at least either of the vehicle-width movement amount and the inclination amount, in response to the own vehicle changing traffic lanes, and setting the provisional area after correction as the monitoring area,
      regarding a first portion of the traveling trajectory before start of lane change, setting the monitoring area comprises setting the portion before the start of lane change as a part of the monitoring area, and
      regarding a second portion of the traveling trajectory after the start of lane change, setting the provisional area comprises setting a predetermined area that is positioned in a predetermined direction in the vicinity of the own vehicle as the provisional area, and correcting the position of the provisional area comprises:
   correcting the position of the provisional area by rotating the provisional area by an amount amounting to the inclination amount, in response to the own vehicle changing traffic lanes, and
   setting the provisional area after correction as another part of the monitoring area.

* * * * *